Oct. 2, 1962 — J. H. FLANDERS — 3,056,243
TANGENTIAL GRINDING
Filed April 13, 1960

INVENTOR
James H. Flanders
BY Sughrue, Rothwell, Mion & Zinn
ATTORNEYS

United States Patent Office 3,056,243
Patented Oct. 2, 1962

3,056,243
TANGENTIAL GRINDING
James H. Flanders, Springfield, Vt., assignor to The Jones & Lamson Machine Company, Springfield, Vt.
Filed Apr. 13, 1960, Ser. No. 22,030
2 Claims. (Cl. 51—289)

This invention relates to improvements in the art of grinding. More particularly, this invention relates to an improved method and apparatus for more accurately controlling the size of a cylindrical workpiece to be ground by moving the workpiece and the grinding wheel relative to each other on a line parallel to a tangent to the grinding wheel and controlling the amount of movement along this line to thereby control the amount of stock ground from the cylindrical workpiece more accurately than the control of the amount of tangential movement.

In the art of grinding the present day demands are for closer and closer tolerance limits and more and more accuracy in the final dimension of the ground workpiece. In the conventional prior art, sizing of a cylindrical workpiece being ground on a grinding wheel is accomplished by relative radial movement between the workpiece and the grinding wheel. The radius of a cylindrical workpiece is directly related in a one to one relationship with the amount of radial relative movement and therefore control of the final dimension of the radius is related in same manner to the stopping point of the relative radial movement.

Workpiece driving spindles and grinding wheel heads cannot always be precisely stopped at exactly the desired point to produce a desired dimension to great accuracy. The stopping point of relative radial movement must be precisely controlled to achieve the extremely high accuracy desirable in modern day machining, and as the accuracy requirements become greater and greater the stopping point of the supports for radial movement between a wheel and workpiece places a limitation on the accuracy that can be obtained using this prior art of grinding method.

It is an object of this invention to alleviate the aforesaid limitation on high accuracy i.e., the effect of not being able to control the stopping point of a workdriving spindle or a grinding wheel head precisely, by moving the grinding wheel and the workpiece relative to each other on a line parallel to a tangent to the grinding wheel such that the effect of not being able to control the stopping point exactly has much less relationship to the final size of the workpiece.

Other objects and advantages of this invention will be pointed out in the following description and claims and illustrated in the accompanying drawings, which disclose, by way of example, the principles of this invention and the best mode of applying these principles.

Figure 1:
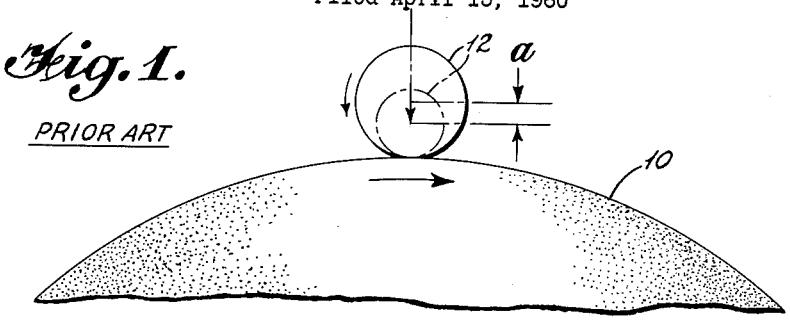
FIG. 1 is a schematic illustration of the prior art method and apparatus for sizing a workpiece in a grinding operation.

Referring to FIG. 1, the conventional prior art grinding machine and method is illustrated schematically for contrast to applicant's method and apparatus. In FIG. 1 a grinding wheel 10 is adapted to be positively rotated and a workpiece 12 is also adapted to be rotated. A workpiece 12 may be moved radially relative to a grinding wheel 10 and after the edge of the workpiece 12 is in contact with the grinding wheel 10 the amount of additional movement radially, determines the amount of material removed from the diameter of the workpiece. For example, referring to FIG. 1, the original size of the workpiece 12 is reduced by the amount "$a$" in radius and the amount two times "$a$" in diameter, when the wheel 10 and workpiece 12 are relatively radially fed toward each other a distance equal to "$a$." Of course, FIG. 1 is only a simplified diagrammatic sketch and there are innumerable ways of accomplishing the relative radial feed movement between the workpiece 12 and the grinding wheel 10 to accomplish the material removal. For example, in centerless grinding the size of the workpiece may be determined by the radial movement of two opposing grinding wheels, etc.

Figure 2:
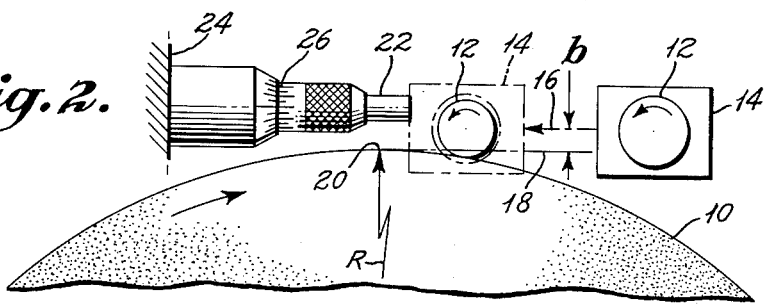
FIG. 2 is a schematic illustration of the method and apparatus of this invention for controlling the size of a workpiece during a grinding operation.

Refer to FIG. 2 for an illustration of applicant's grinding method and apparatus in which a tangential feed movement controls the amount of stock removal. This method accomplishes a more accurate work sizing with the same limitations on stopping positions between two movable members such as a workdriving spindle carriage and a grinding wheel supporting carriage. In FIG. 2, the grinding wheel is again indicated as 10 and the workpiece as 12. The grinding wheel is driven in a conventional manner and the workpiece is also rotated and the driven workpiece is mounted on a carriage 14 for bodily movement in a straight line which line is parallel to a tangent 18 to the periphery of the grinding wheel. The radius of the unground workpiece is greater than the difference "$b$" between the line of bodily movement of the workpiece and the tangent to the grinding wheel such that as the workpiece 12 approaches the grinding wheel due to its bodily movement with carriage 14 it will contact the wheel prior to reaching a point 20 which is the point of tangency of line 18. The zone between the contact point and the tangent point 20 is the zone where material removal will occur. As shown in the drawings, the relative feed movement of the grinding wheel 10 and workpiece 12 along line 16 is setopped at a predetermined point after the grinding commences but before the rotative axes of the grinding wheel 10 and workpiece 12 are on a line 19 which is perpendicular to the tangent 18.

A stop member 22 is fixed to the grinding machine 24 and is adjustable in any conventional manner such as illustrated schematically at 26 for providing an adjustable stop for the movable carriage 14 and thereby controlling the stopping point of the bodily movement of workpiece 12 along line 16.

As mentioned above, it is difficult to control the stopping point of a moving element in a machine tool to a very high degree of accuracy. However, this limitation (which directly affected the size of the workpiece in prior art grinding) does not have the same direct effect upon the size of a workpiece in the tangential grinding method of this invention. This is because a triangular relationship is set up and the effect of the stopping point on the size of the workpiece is equal to the long side of the triangle while the effect of controlling the stopping point of the carriage on the size of the workpiece is related to the short side of the triangle. With a large diameter wheel and a relatively small diameter workpiece, as is conventional in most grinding operations, the effect of not being able to accurately control the stopping position of the movable carriage 14 may be for all effects and purposes disregarded.

Figure 3:
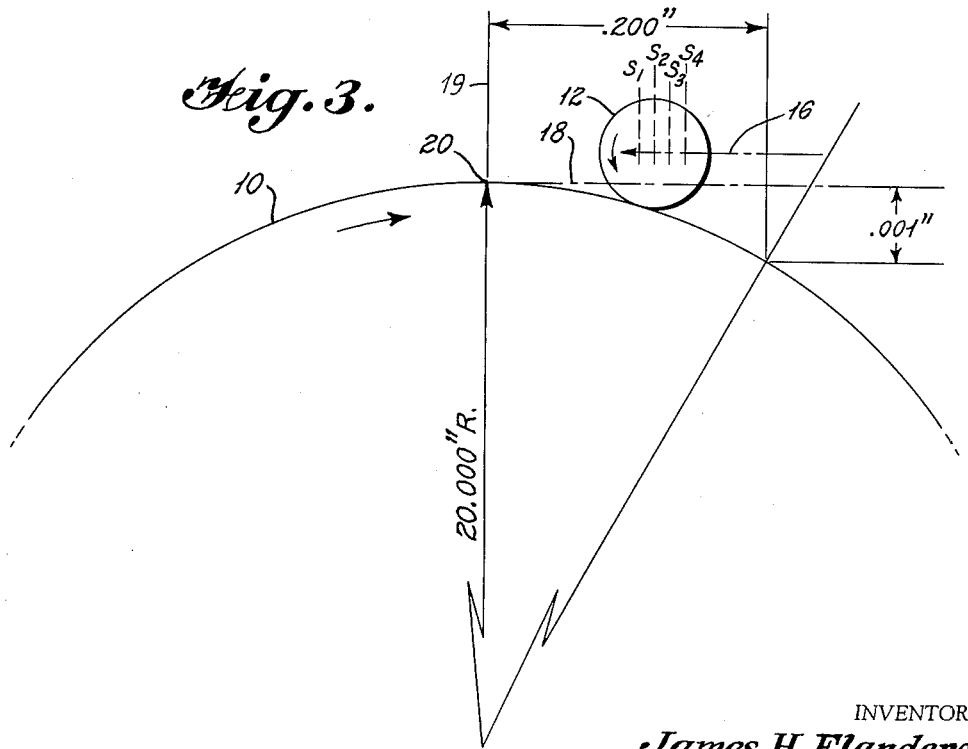
FIG. 3 is a graphical illustration of the geometrical principles utilized in this invention.

Referring to FIG. 3 for an explanation of the geometry involved in the subject invention, an example is taken for the purposes of illustration. The rotating workpiece is again shown as 12, the grinding wheel as 10, the tangent point as 20. The line of feed 16 is parallel to the tangent 18 and is spaced outwardly thereof, a distance less than the radius of the unground and unfinished workpiece 12.

Assume the points S1, S2, S3 and S4 are points of adjustment of the adjustable stop 22 in order to stop the carriage at these points. For a grinding wheel having a 20 inch diameter and for a control of .002 in. of the final diameter size of the workpiece i.e., .001 in. control of the radius, the stopping point of the carriage 14 would not have to be controlled to an accuracy of any more than .2 inch. It can be seen therefore that if the stopping point of the carriage 14 can be controlled within .002 inch (which is easily attainable) theoretically the control of the size of the workpiece in regard to the radius could be held within .00001 inch.

Another way of comparing the results of the use of tangential grinding to the results with the use of radial grinding is to note that in radial grinding the amount of radial movement has a one to one relationship to the amount of material removed from the radius of the workpice (FIG. 1). By way of contrast, using a 20 inch wheel the amount of tangential movement in tangential grinding has approximately a 200 to one relationship to the final size of the workpiece (the exact amount must be corrected for the curvature of the wheel). It can thereby be seen that the control of the stopping point of the tangentially movable carriage by adjustable stop 22 has a great geometrical advantage over control of the size of the workpiece 12 and is many times greater than that which can be accomplished by radial grinding.

Considering the statistical probability curve in the grinding of successive workpieces to the same final dimension, it is impossible to cause the carriage 14 to stop at precisely the same point due to sundry conditions always present in machine tool operations; however, due to the great mechanical advantage accomplished by the geometry of tangential grinding the probability of stopping a movable carriage at the same point (which probability is the same as in radial grinding) has a much less effect on the final size of the workpiece, all other things being equal.

As can be appreciated from the foregoing, applicant has an improved method of tangential sizing of a workpiece in a grinding operation which method comprises moving the workpiece on a straight line parallel to a tangent to the grinding wheel and stopping the bodily movement of the workpiece prior to arriving at the tangent point to thereby accurately control the size of the ground workpiece while being able to disregard the effect of accurately controlling the stopping point.

While there have been shown and described and pointed out the fundamental novel features of this invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A method of sizing a cylindrical surface of a workpiece comprising: rotating a grinding wheel, rotating a workpiece, and bodily moving the workpiece and the grinding wheel in a feed movement relative to each other along a straight line, the relative movement of the workpiece being on a line parallel to a tangent to the periphery of the grinding wheel and being outside the tangent but close enough thereto such that the periphery of the grinding wheel and the periphery of the workpiece will contact each other for grinding action during the relative bodily feed movement, accurately stopping the relative movement of the grinding wheel and workpiece at a predetermined point after the grinding wheel and workpiece are in contact but prior to the rotative axes of the grinding wheel and workpiece reaching points where they are on a line perpendicular to the tangent, and then separating the workpiece from the grinding wheel.

2. A method of sizing a cylindrical surface of a workpiece by grinding, the method comprising: rotating a grinding wheel, rotating a workpiece, and bodily moving the rotating grinding wheel relative to the rotating workpiece along a line of feed, the relative line of feed of the rotating workpiece being parallel to a tangent to the periphery of the grinding wheel and located a distance outside the tangent, which distance is less than the radius of the initial workpiece, such that the periphery of the grinding wheel and the periphery of the workpiece contact for grinding action at a point during the tangential feed movement, continuing the feed movement after the periphery of the grinding wheel and the surface of the workpiece are in contact to remove material from the cylindrical surface by the grinding action of the grinding wheel, accurately stopping the relative movement of the grinding wheel and workpiece at a predetermined point after the grinding wheel and workpiece are in contact but prior to the rotative axes of the grinding wheel and workpiece reaching points where they are on a line perpendicular to the tangent whereby the inherent variation of the precise stopping point of the tangential feed movement has negligible effect on the final size of the workpiece due to the geometry of the arrangement, and finally separating the workpiece from the grinding wheel after the step of accurately stopping the relative feed movement.

References Cited in the file of this patent

UNITED STATES PATENTS

| | | |
|---|---|---|
| 1,816,170 | Booth | July 28, 1931 |
| 1,846,661 | Vuilleumier | Feb. 23, 1932 |
| 2,028,315 | Bruhl et al. | Jan. 21, 1936 |
| 2,674,835 | Senft | Apr. 13, 1954 |